United States Patent
Hu et al.

(10) Patent No.: US 11,989,935 B1
(45) Date of Patent: May 21, 2024

(54) ACTIVITY RECOGNITION METHOD OF LRF LARGE-KERNEL ATTENTION CONVOLUTION NETWORK BASED ON LARGE RECEPTIVE FIELD

(71) Applicants: NANJING UNIVERSITY, Jiangsu (CN); NANJING MORENEW DATA Co. Ltd., Jiangsu (CN)

(72) Inventors: Guangwei Hu, Jiangsu (CN); Qi Teng, Jiangsu (CN); Lei Pei, Jiangsu (CN); Wenwen Pan, Jiangsu (CN); Qi Huang, Jiangsu (CN); Qianyou Zhang, Jiangsu (CN); Cheng Luo, Jiangsu (CN); Yun Liu, Jiangsu (CN)

(73) Assignees: NANJING UNIVERSITY, Nanjing (CN); NANJING MORENEW DATA CO. LTD., Nanjing (CN)

( * ) Notice: Subject to any disclaimer, the term of this patent is extended or adjusted under 35 U.S.C. 154(b) by 0 days.

(21) Appl. No.: 18/392,484

(22) Filed: Dec. 21, 2023

(30) Foreign Application Priority Data

Dec. 28, 2022 (CN) .......................... 202211695992.5

(51) Int. Cl.
*G06V 10/82* (2022.01)
*G06V 10/764* (2022.01)

(52) U.S. Cl.
CPC ............ *G06V 10/82* (2022.01); *G06V 10/764* (2022.01)

(58) Field of Classification Search
CPC .............................. G06V 10/82; G06V 10/764
See application file for complete search history.

(56) References Cited

U.S. PATENT DOCUMENTS

| 2022/0327318 | A1 | 10/2022 | Radhakrishnan et al. |
| 2024/0054603 | A1* | 2/2024 | Akkaya ................ G06N 3/0464 |

FOREIGN PATENT DOCUMENTS

| CN | 111178288 A | 5/2020 |
| CN | 111860188 A | 10/2020 |
| CN | 113033501 A | 6/2021 |
| CN | 114897136 A | 8/2022 |
| CN | 114973393 A | 8/2022 |
| CN | 115225731 A | 10/2022 |
| CN | 115294498 A | 11/2022 |
| CN | 115393719 A | 11/2022 |

(Continued)

OTHER PUBLICATIONS

Jae Won Seo et al., "A deep learning algorithm for automated measurement of vertebral body compression from X-ray images," Scientific Reports, Jul. 2021, 11:13732.

(Continued)

*Primary Examiner* — Bobbak Safaipour
(74) *Attorney, Agent, or Firm* — Pilloff Passino & Cosenza LLP; Rachel K. Pilloff; Sean A. Passino

(57) ABSTRACT

The disclosure relates to an activity recognition method of a large receptive field (LRF) large-kernel attention convolution network based on a large receptive field, the method includes the following steps: collecting an action signal, carrying out a preprocessing and a data partition on the action signal to obtain a data set; and training an LRF large-kernel attention convolution network model based on the data set, and introducing a trained LRF large-kernel attention convolution network model into a mobile wearable recognition device for human posture recognition.

6 Claims, 8 Drawing Sheets

(56) References Cited

FOREIGN PATENT DOCUMENTS

EP    3913534 A1    11/2021
JP    2011238139 A  11/2011

OTHER PUBLICATIONS

Hu Hao et al., "Object Detection Based on Improved YOLOX-S Model in Construction Sites," Journal of Frontiers of Computer Science and Technology, Oct. 2022, pp. 1,089-1,101, vol. 17, No. 5. (absract translated).

Jiang Su et al., "Redundancy-Reduced MobileNet Acceleration on Reconfigurable Logic for ImageNet Classification," RR-MobileNet Acceleration on FPGA, Jan. 2018, pp. 16-28.

Jean-Baptiste Weibel et al., "Robust 3D Object Classification by Combining Point Pair Features and Graph Convolution," 2019 International Conference on Robotics and Automation (ICRA), May 20-24, 2019, pp. 7,262-7,268.

Fang Jing et al., "Research on LRF-ELM algorithm and its application in object material classification," China Excellent Master's Dissertation Full-text Database Information Technology Series, Oct. 2018, No. 10.

Yin Tang et al., "Triple Cross-Domain Attention on Human Activity Recognition Using Wearable Sensors," IEEE Transactions on Emerging Topics in Computational Intelligence, Oct. 2022, pp. 1, 167-1,176, vol. 6, No. 5. (abstract translated).

Office Action for China Application No. 202211695992.5, dated Jun. 30, 2023.

Notice to Grant for China Application No. 202211695992.5, dated Aug. 21, 2023.

First Search Report for China Application No. 202211695992.5, dated Jun. 29, 2023.

Supplementary Search Report for China Application No. 202211695992.5, dated Aug. 17, 2023.

* cited by examiner

ACTIVITY RECOGNITION METHOD OF LRF LARGE-KERNEL ATTENTION CONVOLUTION NETWORK BASED ON LARGE RECEPTIVE FIELD

CROSS-REFERENCE TO RELATED APPLICATIONS

This disclosure claims priority to Chinese Patent Application No. 202211695992.5, filed on Dec. 28, 2022, the contents of which are hereby incorporated by reference.

TECHNICAL FIELD

The disclosure relates to technical fields of deep learning and mobile wearable human activity recognition, and in particular to an activity recognition method of a large receptive field (LRF) large-kernel attention convolution network based on a large receptive field.

BACKGROUND

A sensor-based human activity recognition method is a technology to realize physical activity recognition by analyzing sensor signal data, and has been applied to intelligent monitoring, health care, virtual reality and other fields. At present, the mainstream human activity recognition (HAR) method uses a machine learning or deep learning model to collect continuous activity signals through wearable devices and carry out activity recognition. HAR method based on a wearable sensor has attracted people's attention because of its portability and privacy.

In recent years, researchers have turned their attention from data-driven feature engineering technologies to methods based on deep neural network. Compared with the heuristic manual feature extraction of feature engineering technology, the activity recognition method based on deep learning may automatically extract the feature information of the target task, thus greatly reducing the labor cost of manual feature extraction. Researchers have recently discovered that the model network based on deep learning plays a vital role in effectively capturing the effective receptive field when performing human activity recognition. Generally speaking, a larger effective receptive field is accompanied by a higher performance gain. However, an expansion of the effective receptive field requires the stacking of deeper network layers, which hinders the application of HAR to mobile sensor devices with limited computing power, and is also an important reason that the activity recognition method based on a large receptive field does not appear in the mainstream HAR field.

According to the work of the present disclosure, the algorithm model of a convolutional neural network based on the large receptive field deepens the number of network layers while improving the activity recognition performance, which brings huge computational burden to the sensor devices with limited computing power, so the algorithm model of the convolutional neural network based on the large receptive field is difficult to popularize and apply. In addition, although the neural network method based on large convolution kernel may also expand the effective receptive field, simply increasing the size of the convolution kernel still requires the introduction of a large number of calculation parameters.

SUMMARY

The present disclosure aims to provide an activity recognition method of a large receptive field (LRF) large-kernel attention convolution network based on a large receptive field, so as to realize greater performance gain of an effective receptive field on activity recognition, broaden activity recognition types of wearable sensors, enhance the recognition fault tolerance rate of nonstandard actions, and promote the deployment and development of activity recognition based on wearable mobile devices in various fields.

In order to achieve the above objectives, the present disclosure provides a following scheme.

The activity recognition method of the LRF large-kernel attention convolution network based on the large receptive field includes:
  collecting an action signal, carrying out a preprocessing and a data partition on the action signal to obtain a data set; and
  training an LRF large-kernel attention convolution network model based on the data set, and introducing a trained LRF large-kernel attention convolution network model into a mobile wearable recognition device for human posture recognition.

Optionally, the collecting the action signal includes:
  collecting the action signal through a mobile sensor device, and comparing with a recorded video timestamp to mark a corresponding action type for the action signal.

Optionally, the carrying out the preprocessing on the action signal includes:
  carrying out preprocessing operations of denoising, filtering and normalization on the action signal.

Optionally, the carrying out the data partition on the action signal includes:
  setting a time interval, a sliding window length and a sample overlap rate according to a sampling frequency of the mobile sensor device, and carrying out a data cutting partition on a preprocessed action signal to form a data set, where the data set includes a verification set, a training set and a test set.

Optionally, the LRF large-kernel attention convolution network model includes:
  an LRF large-kernel attention convolution network with three layers and a fully connected classification output layer, where the LRF large-kernel attention convolution network includes a local depth convolution layer, a long-distance depth expansion convolution layer and a 1×1 ordinary convolution layer for feature extraction; and the fully connected classification output layer is used for action classification.

Optionally, a calculation method of the LRF large-kernel attention convolution network model includes:

$$X = \begin{bmatrix} x_1^1 & \cdots & x_1^t \\ \vdots & \ddots & \vdots \\ x_s^1 & \cdots & x_s^t \end{bmatrix} \quad (1)$$

where X represents an input matrix, t represents a time step of the input matrix, and s represents a sensor mode of the input matrix;
  compressing the input matrix X into one-dimensional data, and introducing the input matrix X into a self-attention module, outputting a weighted sum of all value vectors, and using a Softmax function for normalization:

$$\text{Attention}(Q, K, V) = \text{Softmax}\left(\frac{QK^T}{\sqrt{d_k}}\right)V \quad (2)$$

where Q, K, and V represent a query value, a key value and a vector value respectively; and $d_k$ represents the scaling factor;

proposing an LRF attention mechanism to capture time information and modal information in sensor activity images:

$$X'=\text{ReLU}(BN(\text{Conv2d}(X))) \quad (3)$$

where X' represents a node output matrix in four dimensions, ReLU represents an activation function, and Conv2d represents a two-dimensional convolution operation;

obtaining a normalized output result of the node output matrix X' by a layer normalization function, and further strengthening a network anti-degradation ability by shortcut link:

$$X''=X'+LRF(LN(X')) \quad (4)$$

where symbols LRF and LN represent a large-kernel receptive field attention mechanism and the layer normalization function respectively;

outputting a feedforward network including a multilayer perceptron and a normalization layer by formula (4):

$$X'''=X''+MLP(L\ N(X')) \quad (5)$$

where symbols MLP and LN represent multilayer perceptron and layer normalization respectively.

Optionally, the training the LRF large-kernel attention convolution network model based on the data set includes:

when a training of the LRF large-kernel attention convolution network model meets recognition accuracy requirements, saving training weight parameters and transplanting the training weight parameters to the mobile wearable recognition device; otherwise, if a recognition accuracy does not meet the recognition accuracy requirements, adjusting by hyper-parameters of the LRF large-kernel attention convolution network model.

Optionally, the mobile wearable recognition device includes a mobile wearable recognition device provided with a neural network processing unit.

The disclosure has following beneficial effects.

Firstly, compared with the conventional small-kernel activity recognition model, the LRF large-kernel attention convolution network based on the large receptive field provided by the disclosure has a large-kernel convolutional layer decomposed into three cascade submodules: a local depth convolution across different sensor modes, a long-distance depth convolution along time series and 1×1 ordinary convolution, so that a dual feature extraction of the time information and the modal information may be realized.

Secondly, the disclosure provides a human action recognition method using the attention network of the effective receptive field of the shallow large nucleus for weakly-labeled data types, thus realizing greater performance gain of the effective receptive field for activity recognition.

Lastly, the LRF attention mechanism in the present disclosure replaces a multi-head self-attention module in a visual architecture, aggregates activity information in a larger neighborhood of each feature map, and generates a more valuable attention map; the LRF large-kernel attention convolution network enhances the fault tolerance rate of the non-standard actions, promotes the deployment and development of the activity recognition based on the wearable mobile devices in many fields, may be seamlessly transplanted to the smart wearable devices, and has commercial application potential.

BRIEF DESCRIPTION OF THE DRAWINGS

In order to explain the embodiments of the present disclosure or the technical scheme in the prior art more clearly, the drawings needed in the embodiments are briefly introduced below. Obviously, the drawings in the following description are only some embodiments of the present disclosure. For ordinary people in the field, other drawings may be obtained according to the drawings without paying creative labor.

DETAILED DESCRIPTION OF THE EMBODIMENTS

In the following, the technical scheme in the embodiment of the disclosure is clearly and completely described with reference to the attached drawings. Obviously, the described embodiment is only a part of the embodiment of the disclosure, but not the whole embodiment. Based on the embodiments in the present disclosure, all other embodiments obtained by ordinary technicians in the field without creative labor belong to the scope of protection of the present disclosure.

In order to make the above objects, features and advantages of the present disclosure more obvious and easier to understand, the present disclosure is further described in detail with the attached drawings and specific embodiments.

Figure 1:
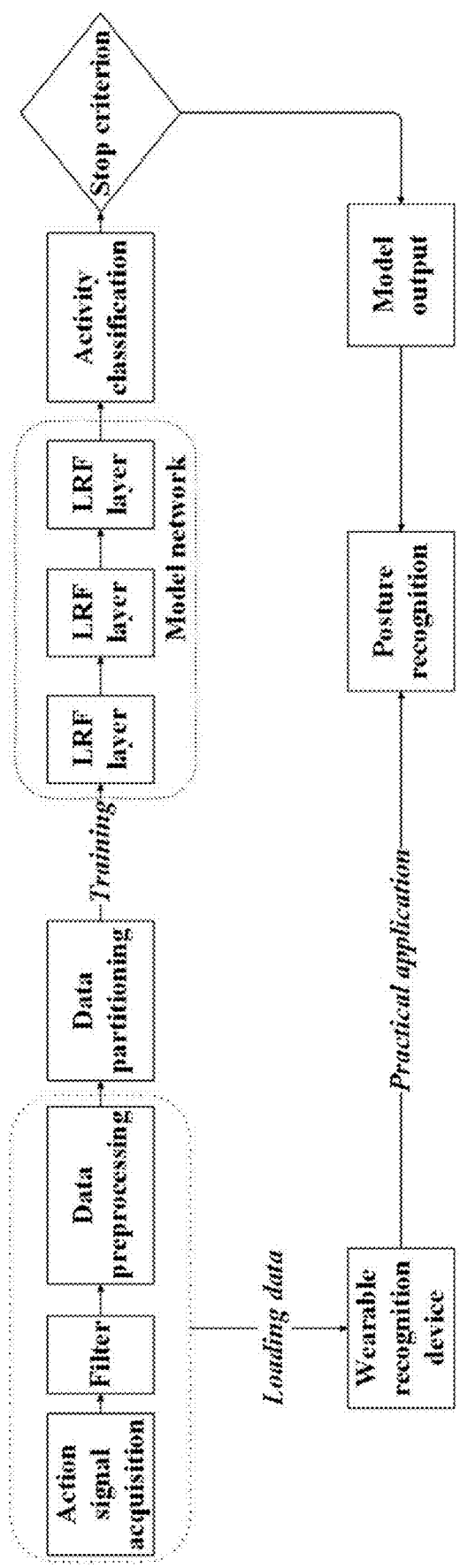
FIG. 1 is a flow chart of an activity recognition of a large receptive field (LRF) large-kernel attention convolution network based on a large receptive field in an embodiment of the present disclosure.

This embodiment provides an activity recognition method of a large receptive field (LRF) large-kernel attention convolution network based on a large receptive field, which may recognize diverse sensor signals such as daily actions, life actions, medical health and so on. As shown in FIG. 1, a specific process includes:

S1, collecting the action signal through a mobile sensor device, and comparing with a recorded video timestamp to mark a corresponding action type for the action signal;

S2, filtering the collected motion signal by a Butterworth noise filter, setting a reasonable sliding window and a sample overlap rate, and dividing obtained data into a verification set, a training set and a test set, with sample ratios of p %, q % and r % respectively, meeting conditions of p %+q %+r %=100%, and 62%≤p %≤72%, 22%≤q %≤27%, 6%≤r %≤18%;

S3, sending a processed data set into the LRF large-kernel attention convolution network for model training and classifying human actions; and S4, introducing trained model network weights into a wearable recognition device with a neural network processing unit, and finally realizing high-precision human posture recognition.

In the embodiment, a reasonable time interval is set according to a sampling frequency of the mobile sensor device, the window length is not less than 500, and the overlap rate is 50%. The collected sensor signal includes but not limited to sensor signals such as acceleration and gyroscope. The sampling frequency is flexibly set according to characteristics of the collected sensor signal. Recruited volunteers should cover all ages and genders as much as possible, and perform a certain action type repeatedly as required.

The LRF large-kernel attention convolution network is trained, and the collected samples are divided into three categories: the verification set, the training set and the test set. The sample proportions are p %, q % and r % respectively, and the condition of p %+q %+r %=100% is met, and 62%≤p %≤72%, 22%≤q %≤27%, 6%≤r %≤18%.

Figure 2:
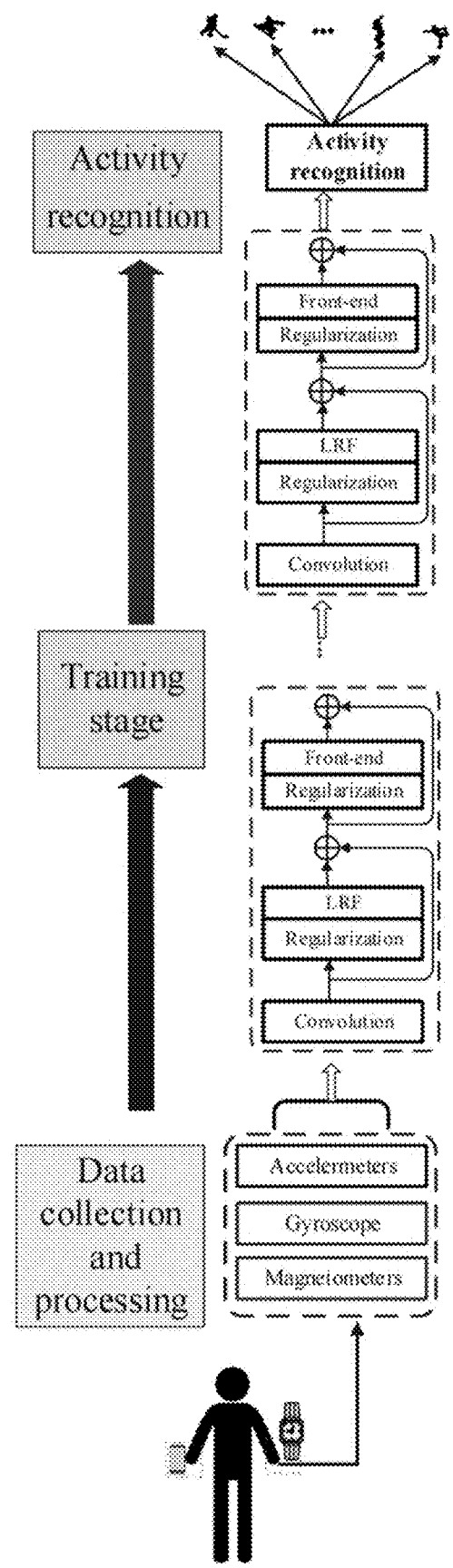
FIG. 2 is a schematic diagram of the LRF large-kernel attention convolution network in an embodiment of the present disclosure.

The core algorithm of the LRF large-kernel attention convolution network based on mobile wearable activity recognition, as shown in FIG. 2, the LRF large-kernel attention convolution network mainly includes: an LRF large-kernel attention convolution network with three layers and a fully connected classification output layer, where the LRF large-kernel attention convolution network includes a local depth convolution layer, a long-distance depth expansion convolution layer and a 1×1 ordinary convolution layer (also known as large receptive field attention), and the three convolution layers together form a layer of LRF large-kernel attention, and each LRF is one of the components of each sub-module.

The mathematical reasoning and expression is:

$$X = \begin{bmatrix} x_1^1 & \cdots & x_1^t \\ \cdots & \ddots & \cdots \\ x_s^1 & \cdots & x_s^t \end{bmatrix} \quad (1)$$

where in an input matrix X, t represents a time step of the input matrix, and s represents a sensor mode of the input matrix.

In order to send the sensor data into the LRF neural network, the input matrix need to be compressed into one-dimensional data. In order to effectively process the sensor data compressed into one dimension, a self-attention module is introduced in this embodiment. A weighted sum of all value vectors is output, where the weight of each vector is calculated by point multiplication between the query vector and the corresponding key vector, and the Softmax function is used for a further normalization; the specific form is as follows:

$$\text{Attention}(Q, K, V) = \text{Softmax}\left(\frac{QK^T}{\sqrt{d_k}}\right)V \quad (2)$$

where Q, K, and V represent a query value, a key value and a vector value respectively; and $d_k$ represents the scaling factor, and $d_k$ is used to avoid a variance effect caused by point multiplication.

In order to capture time information and modal information in sensor activity images, the embodiment proposes an LRF attention mechanism replacing a multi-head self-attention module in the visual architecture. Different from the conventional self-attention module, the large-kernel convolution in the proposed LRF attention mechanism integrates activity information of a larger neighborhood of each feature map and produces a more valuable attention map; the specific form is as follows:

$$X' = \text{ReLU}(BN(\text{Conv2d}(X))) \quad (3)$$

where X represents input data, X' represents a node output matrix in four dimensions, ReLU represents an activation function, and Conv2d represents a two-dimensional convolution operation.

The node output matrix is normalized by a layer normalization function to obtain a normalized output result, and a network anti-degradation ability is further strengthened by shortcut link, the specific form is as follows:

$$X'' = X' + LRF(LN(X')) \quad (4)$$

where symbols LRF and LN represent a large-kernel receptive field attention mechanism and the layer normalization function respectively.

The above formula (4) outputs a feedforward network consisting of a multilayer perceptron and a normalization lay, and finally a following form is obtained:

$$X''' = X'' + MLP(LN(X'')) \quad (5)$$

where symbols MLP and LN represent multilayer perceptron and layer normalization respectively.

Figure 3A:
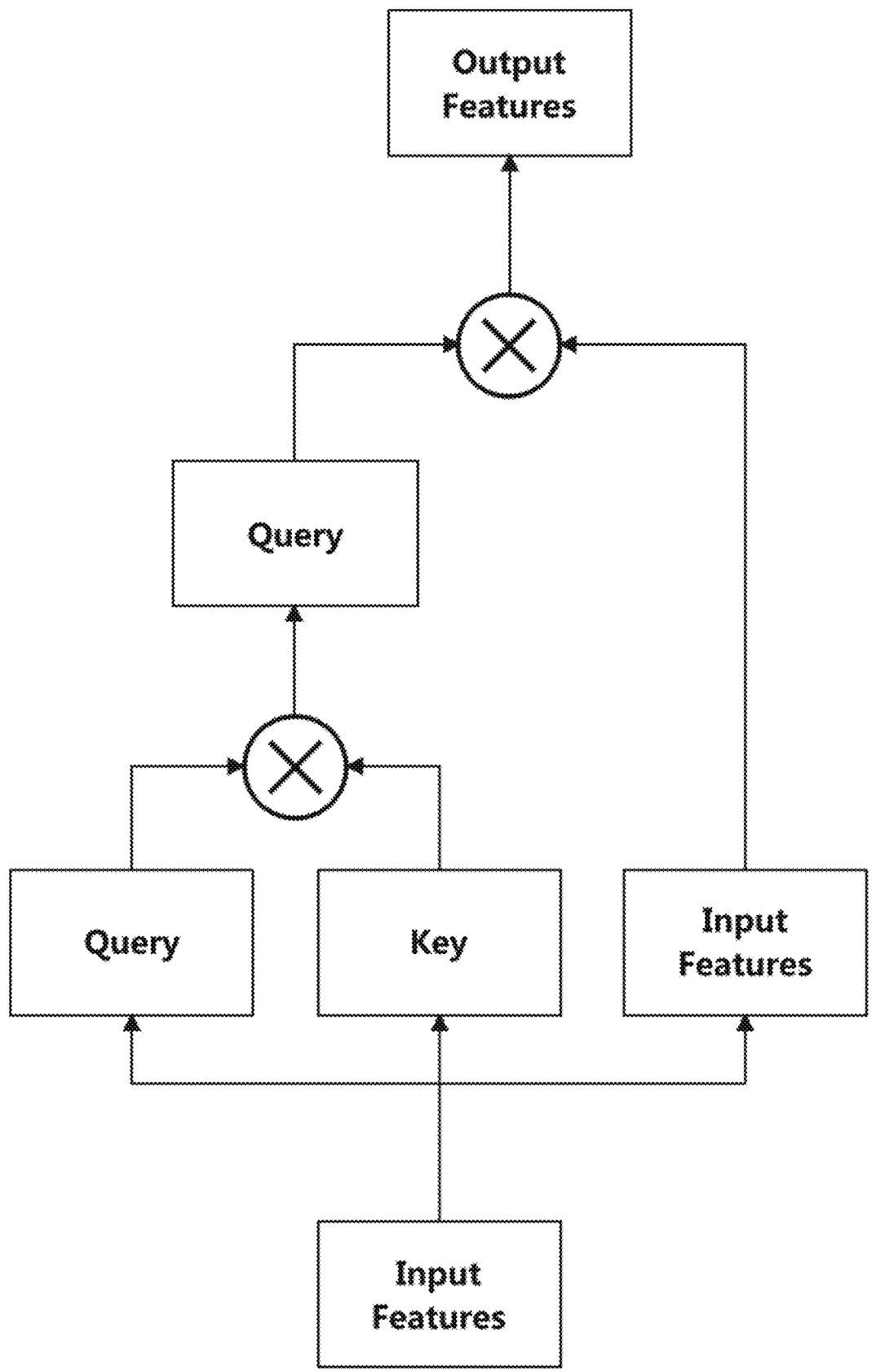
FIG. 3A shows self-attention module.
Figure 3B:
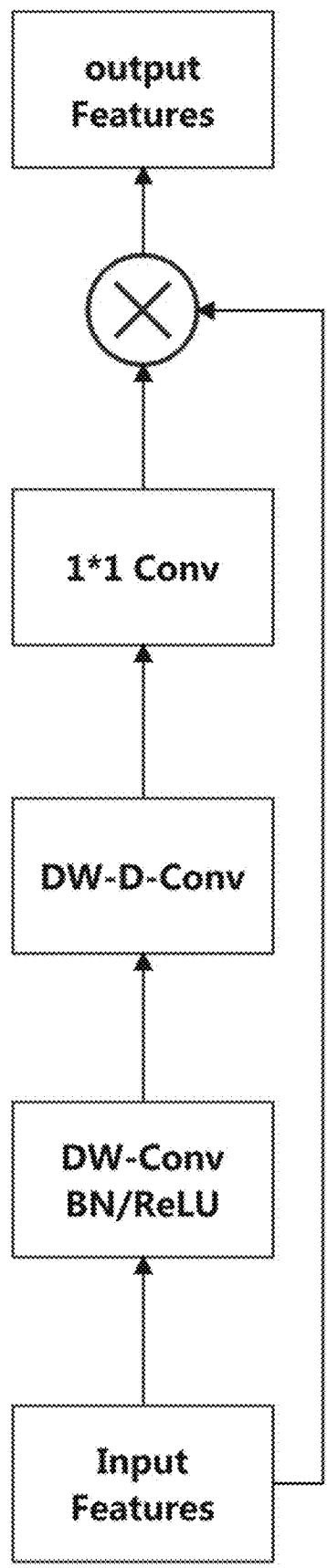
FIG. 3B shows LRF attention module.

The LRF large-kernel attention convolution network may be divided into three feature extraction modules, in which the large-kernel in each module refers to 35≥n≥7 in the convolution kernel (n, 1); the number of fully connected layer neurons output by an action classification output layer is greater than the number of action types. In order to make the proposed LRF attention work effectively, as shown in FIG. 3A and FIG. 3B, the embodiment designs a hierarchical structure similar to Vision Transformer (ViT) to extract dual advantages of the convolution network and self-attention mechanism.

Figure 4A:
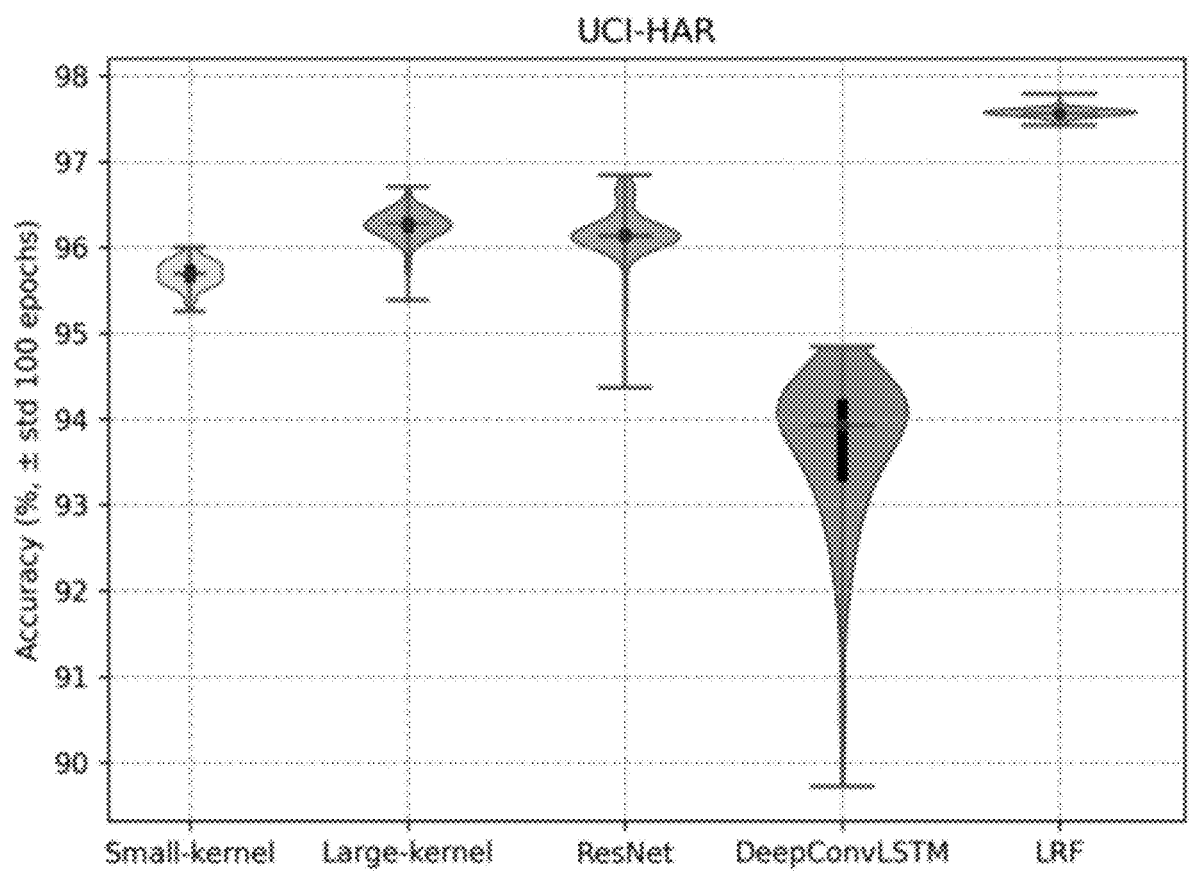
FIG. 4A is the comparison of box-and-line plots for different models on the UCI-HAR dataset.
Figure 4B:
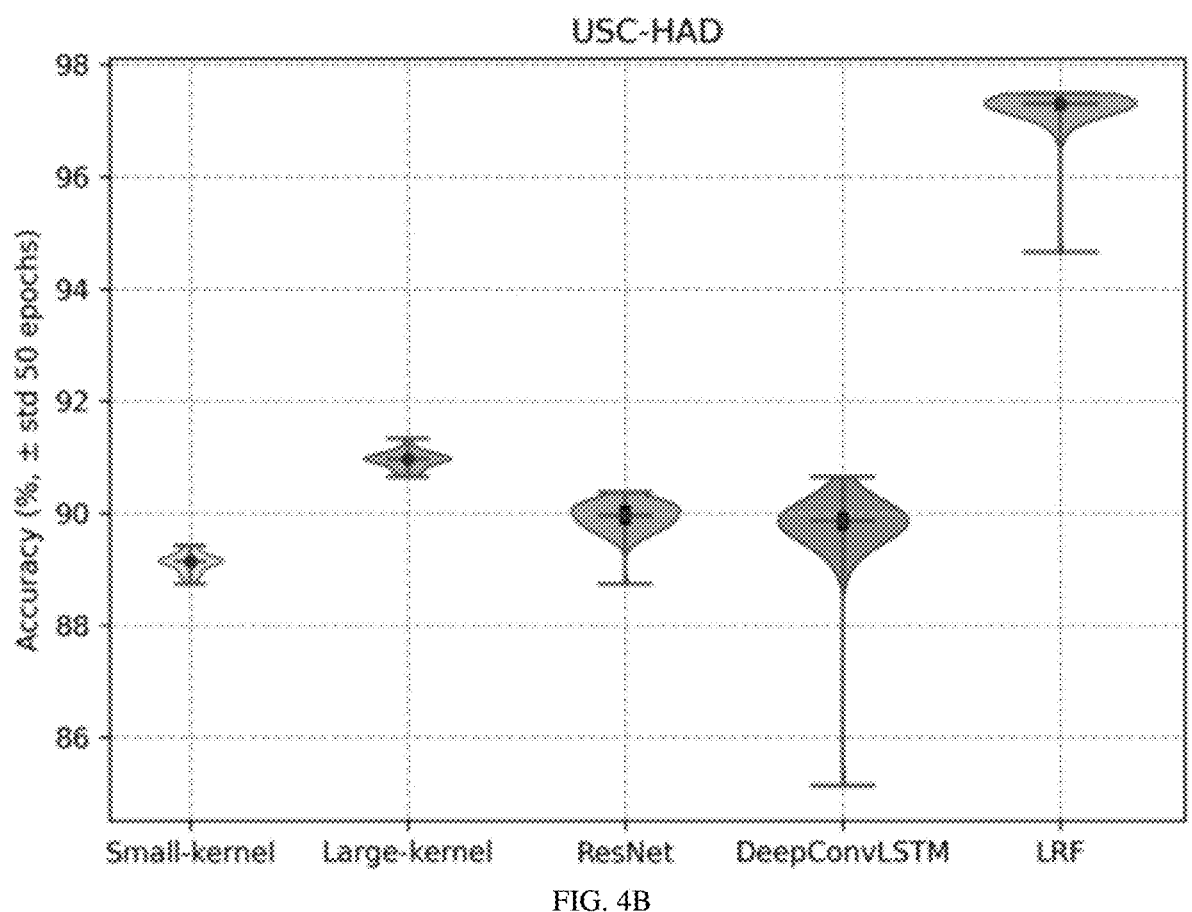
FIG. 4B is the comparison of box-and-line plots for different models on the USC-HAD dataset.
Figure 4C:
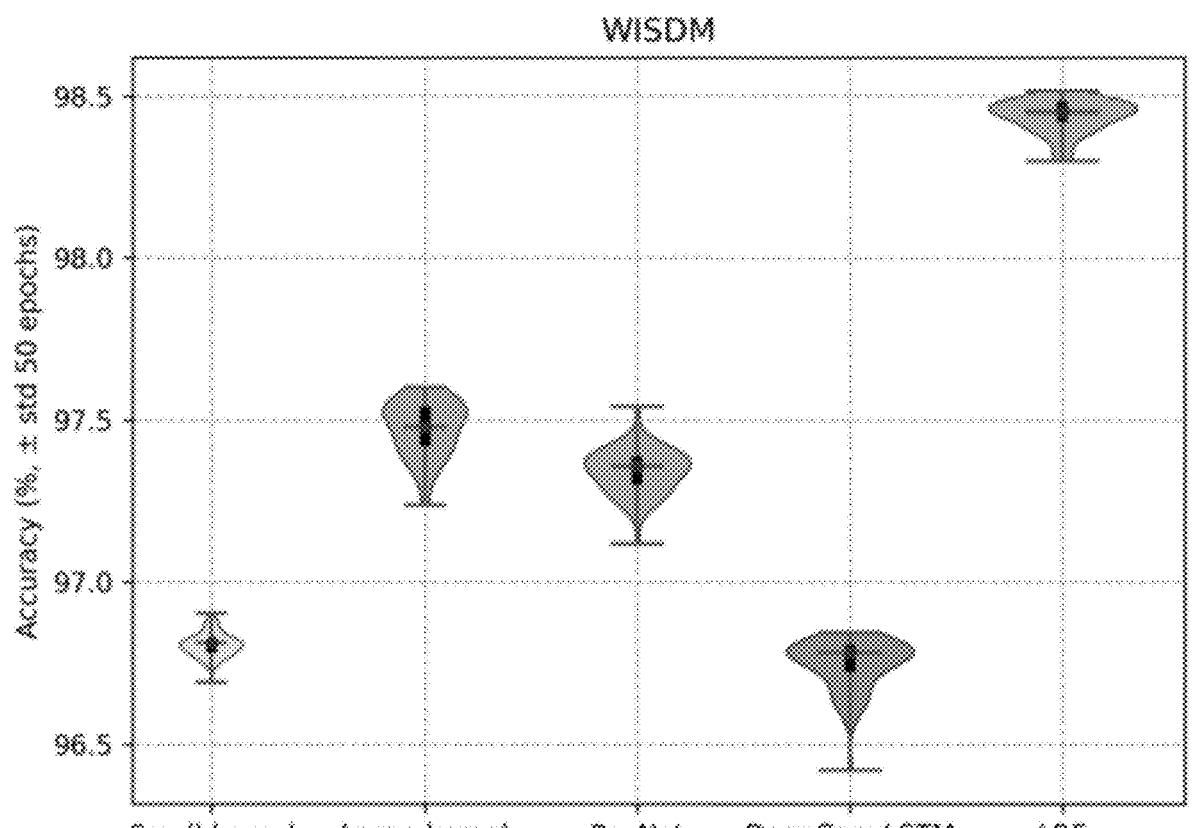
FIG. 4C is the comparison of box-and-line plots for different models on the WISDM dataset.
Figure 4D:
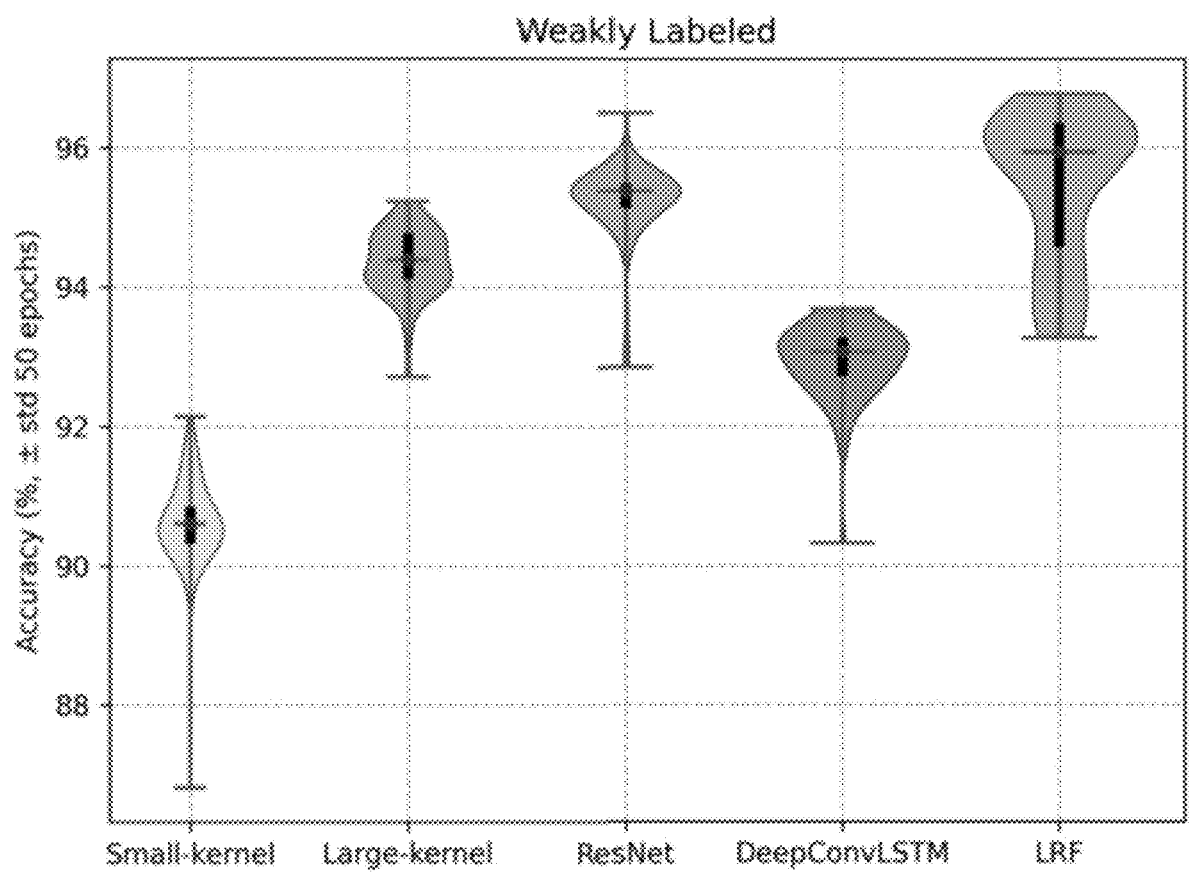
FIG. 4D is the comparison of box-and-line plots for different models on the Weakly labels dataset.

When the training of the LRF large-kernel attention convolution network meets accuracy requirements, the training weight parameters may be saved and transplanted to the mobile wearable recognition device with the neural network computing unit. FIG. 4A is the comparison of box-and-line plots for different models on the UCI-HAR dataset, FIG. 4B is the comparison of box-and-line plots for different models on the USC-HAD dataset, FIG. 4C is the comparison of box-and-line plots for different models on the WISDM dataset, and FIG. 4D is the comparison of box-and-line plots for different models on the Weakly labels dataset. Otherwise, if the recognition accuracy does not meet the recognition requirements, the recognition accuracy may be reasonably adjusted by hyper-parameters of the LRF large-kernel attention convolution network.

The activity recognition method of the LRF large-kernel attention convolution network based on the large receptive field in the Embodiment may be applied to mobile wearable recognition devices with neural network units, including smart bracelets, smart watches, smart phones and other device terminals.

The activity recognition method of the LRF large-kernel attention convolution network based on the large receptive field in the disclosure may collect the required sensor signals through the mobile wearable recognition device, and after data preprocessing operations such as noise reduction, filtering, normalization and the like, the obtained data are sent to the LRF large-kernel attention convolution network for training, and when the stopping criteria is met, the trained network weight parameters are transplanted to the mobile wearable recognition device with a neural network operation unit, so that the purpose of high-precision and low-parameter action recognition is finally achieved.

The above-mentioned embodiment is only a description of the preferred mode of the disclosure, and does not limit the scope of the disclosure. Under the premise of not departing from the design spirit of the disclosure, various modifications and improvements made by ordinary technicians in the field to the technical scheme of the disclosure shall fall within the protection scope determined by the claims of the disclosure.

What is claimed is:

1. An activity recognition method of an LRF (large receptive field) large kernel attention convolution network based on a large receptive field, comprising:
collecting an action signal, carrying out a preprocessing and a data partition on the action signal to obtain a data set; and
training an LRF large-kernel attention convolution network model based on the data set, and introducing a trained LRF large-kernel attention convolution network model into a mobile wearable recognition device for a human posture recognition;
wherein the LRF large-kernel attention convolution network model comprises:
a n LRF large-kernel attention convolution network with three layers and a fully connected classification output layer, wherein the LRF large-kernel attention convolution network comprises a local depth convolution layer, a long-distance depth expansion convolution layer and a 1×1 ordinary convolution layer for a feature extraction; and the fully connected classification output layer is used for an action classification;
a calculation method of the LRF large-kernel attention convolution network model comprises:

$$X = \begin{bmatrix} x_1^1 & \cdots & x_1^t \\ \cdots & \ddots & \cdots \\ x_s^1 & \cdots & x_s^t \end{bmatrix}$$

wherein X represents an input matrix, t represents a time step of the input matrix, and s represents a sensor mode the input matrix;
compressing the input matrix X into one-dimensional data, and introducing into a self-attention module, outputting a weighted sum of all value vectors, and using a Softmax function for a normalization;

$$\text{Attention}(Q, K, V) = \text{Softmax}\left(\frac{QK^T}{\sqrt{d_k}}\right)V$$

wherein Q, K, and V represent a query value, a key value and a vector value respectively; and $d_k$ represents a scaling factor;
proposing an LRF attention mechanism to capture time information and modal information in sensor activity images:

$$X' = \text{ReLU}(BN(\text{Conv2d}(X))) \quad (3)$$

wherein X' represents a node output matrix in four dimensions, ReLU represents an activation function, and Conv2d represents a two-dimensional convolution operation;
obtaining a normalized output result of the node output matrix X' by a layer normalization function, and further strengthening a network anti-degradation ability by a shortcut link:

$$X'' = X' + LRF(LN(X')) \quad (4)$$

wherein a symbol LRF and a symbol LN represent a leak-kernel receptive field attention mechanism and the layer normalization function respectively;
outputting a feedforward network comprising a multilayer perceptron and a normalization layer by formula (4):

$$X''' = X'' + MLP(L N(X'')) \quad (5)$$

wherein symbol MLP and LN represent the multilayer perceptron and a layer normalization respectively.

2. The activity recognition method of the LRF large-kernel attention convolution network based on the large receptive field according to claim 1, wherein the collecting the action signal comprises:
collecting the action signal through a mobile sensor device, and comparing with a recorded video timestamp to mark a corresponding action type for the action signal.

3. The activity recognition method of the LRF large-kernel attention convolution network based on the large receptive field according to claim 1, wherein the carrying out the preprocessing on the action signal comprises:
carrying out preprocessing operations of denoising, filtering and normalization on the action signal.

4. The activity recognition method of the LRF large-kernel attention convolution network based on the large receptive field according to claim 1, wherein the carrying out the data partition on the action signal comprises:
setting a time interval, a sliding window length and a sample overlap rate according to a sampling frequency of the mobile sensor device, and carrying out a data cutting partition on a preprocessed action signal to form a data set, wherein the data set comprises a verification set, a training set and a test set.

5. The activity recognition method of the LRF large-kernel attention convolution network based on the large receptive field according to claim 1, wherein the training the LRF large-kernel attention convolution network model based on the data set comprises:
when a training of the LRF large-kernel attention convolution network model meets recognition accuracy requirements, saving and transplanting training weight parameters to the mobile wearable recognition device; otherwise, if a recognition accuracy does not meet the recognition accuracy requirements, adjusting by hyperparameters of the LRF large-kernel attention convolution network model.

6. The activity recognition method of the LRF large-kernel attention convolution network based on the large receptive field according to claim 1, wherein the mobile wearable recognition device comprises a mobile wearable recognition device provided with a neural network processing unit.

* * * * *